(12) United States Patent
Shaked et al.

(10) Patent No.: US 9,607,022 B2
(45) Date of Patent: Mar. 28, 2017

(54) AUTOMATIC DATA STORE ARCHITECTURE DETECTION

(75) Inventors: Guy Shaked, Be'er Sheva (IL); Valdimir Braverman, Los Angeles, CA (US); Marina Sadetsky, Kfar Saba (IL)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 1483 days.

(21) Appl. No.: 13/139,718

(22) PCT Filed: Dec. 14, 2009

(86) PCT No.: PCT/IL2009/001187
§ 371 (c)(1),
(2), (4) Date: Nov. 28, 2011

(87) PCT Pub. No.: WO2010/070638
PCT Pub. Date: Jun. 24, 2010

(65) Prior Publication Data
US 2012/0066264 A1    Mar. 15, 2012

(30) Foreign Application Priority Data
Dec. 15, 2008  (IL) .......................................... 195956

(51) Int. Cl.
G06F 17/30    (2006.01)
(52) U.S. Cl.
CPC .............................. *G06F 17/30306* (2013.01)
(58) Field of Classification Search
CPC ................................................ G06F 17/30306
See application file for complete search history.

(56) References Cited

U.S. PATENT DOCUMENTS 5,675,785 A    10/1997    Hall et al.
5,926,810 A    7/1999    Noble et al.
(Continued)

FOREIGN PATENT DOCUMENTS

JP    62-290948    12/1987
JP    2007-272518    10/2007
WO    WO 01/35256 A2    5/2001

OTHER PUBLICATIONS

"Self-tuning Database Technology and Information Services: from Wishful Thinking to Viable Engineering;" Weikum et al.; University of Saarland, Saarbruecken, Germany; Published in VLDB '02 Proceedings of the 28th international conference on Very Large Data Bases. 2002.*
(Continued)

*Primary Examiner* — Scott A Waldron
*Assistant Examiner* — Mellissa M Ohba
(74) *Attorney, Agent, or Firm* — Knobbe, Martens, Olson & Bear LLP

(57) ABSTRACT

The present invention is a system for automatic recognition of data store architecture and tracking dynamic changes and evolution in data store architecture. The system of the invention is a complementary system, which can be added onto an existing data store system using the existing interfaces or can be integrated with a data store system. The system comprises three main components that are configured to compose an approximation of the data store architecture. The first of these components is adapted to execute an analysis of the architecture of the data store; the second of the components is adapted to collect and compile statistics from said data store; and the third of the components is adapted to compose an approximation of the architecture of said data store. Methods for using the system of the invention are also described.

21 Claims, 7 Drawing Sheets

(56) References Cited

U.S. PATENT DOCUMENTS

| | | | |
|---|---|---|---|
| 6,408,292 | B1 | 6/2002 | Bakalash et al. |
| 7,194,451 | B2 * | 3/2007 | Chaudhuri et al. ............ 707/694 |
| 7,526,508 | B2 * | 4/2009 | Tan et al. ............... 707/999.002 |
| 2002/0087587 | A1 | 7/2002 | Vos et al. |
| 2002/0169777 | A1 | 11/2002 | Balajel et al. |
| 2003/0105658 | A1 | 6/2003 | Chen et al. |
| 2004/0133552 | A1 | 7/2004 | Greenfield et al. |
| 2005/0044102 | A1 | 2/2005 | Gupta et al. |
| 2006/0173926 | A1 | 8/2006 | Kornelson et al. |
| 2006/0190432 | A1 | 8/2006 | Wang et al. |
| 2007/0005297 | A1 | 1/2007 | Beresniewicz et al. |
| 2007/0191688 | A1 | 8/2007 | Lynn |
| 2008/0126408 | A1 | 5/2008 | Middleton |
| 2008/0133454 | A1 | 6/2008 | Markl et al. |
| 2009/0006310 | A1 | 1/2009 | Tanaka et al. |
| 2009/0018996 | A1 | 1/2009 | Hunt et al. |

OTHER PUBLICATIONS

European Search Report dated Sep. 16, 2013, Application No. 09833059.0-1951 / 2377021 PCT/IL2009/001187, 11 pages.

Fabien De Marchi et al.; "Analysis of existing databases at the logical level", *ACM Sigmod Record*, vol. 32, No. 1, Mar. 1, 2003, pp. 47-52.

Surajit Chaudhuri et al.; "Self-Tuning Database Systems: A Decade of Progress"; *Proceedings of the 33$^{rd}$ International Conference on Very Large Data Bases*, Sep. 23, 2007-Sep. 28, 2007, pp. 3-14.

Canadian Office Action dated Oct. 24, 2013 in Application No. 2,746,724 (3 pages).

International Search Report for PCT/IL2009/001187 mailed Apr. 12, 2010.

Japanese Office Action for Application No. 2011-540324 dated Nov. 5, 2013.

European Office Action dated Oct. 20, 2015; Application No. 09 833 059.0-1951, 8 pp.

Stephens, Ryan, et al: "Working with the System Catalog" in: "Sams Teach Yourself SQL in 24 Hours, Fourth Edition," May 30, 2008 (May 30, 2008) Sams, XP055220 187, ISBN: 978-0-7686-8277, 329-339, 11 pp.

Chaudhuri, et al. "Self-Tuning Database Systems: A Decade of Progress," VLDB '07, Sep. 23-28, 2007, 12 pages.

* cited by examiner

AUTOMATIC DATA STORE ARCHITECTURE DETECTION

CROSS-REFERENCE TO RELATED APPLICATIONS

This application is the U.S. National Phase of the PCT International Application Number PCT/IL2009/001187, entitled AUTOMATIC DATA STORE ARCHITECTURE DETECTION, filed Dec. 14, 2009, designating the United States and published on Jun. 24, 2010 as WO 2010/070638, which claims priority to Israel Patent Application Number IL195956, filed Dec. 15, 2008. The disclosure of both prior applications are incorporated by reference in their entirety and should be considered a part of this specification.

FIELD OF THE INVENTION

The present invention relates to the field of digital data stores. More particularly, it relates to a method of and a system for automatic recognition of data store architecture and tracking dynamic changes and evolution in data store architecture.

BACKGROUND OF THE INVENTION

Herein the phrase "data store architecture" refers to the relationship between the columns of data store tables. The information about the initial design of the architecture is usually stored in a graphic/text document and is not part of the data store itself. This document is usually written at the initial stage of designing the data store and usually it is not updated after upgrades/changes. This document becomes less and less accurate very rapidly. Using the incorrect columns/wrong operation on columns in an application will cause inaccurate or wrong results. Many applications, which are usually not developed at the same time as the initial data store architecture, use the data store. Each such application causes some changes to the data store architecture. The end result is that the original design document does not reflect accurately the actual architecture of the data store. The difference gets larger each time that another application is implemented on the data store.

Herein the word "user" is used to refer to either a person who is responsible for applications improvement, or to an automatic software application which uses information about the data store to improve performance of data store.

Herein the phrase "end-user" is used to refer to a person that asks a query and expects to get an answer.

Herein the phrase "architecture approximation" is used to refer to an analysis report which is generated after using a "Data Store Architecture Analyzer". An architecture approximation includes a technical description of data store architecture, i.e. the relationship between objects and columns, with some useful information about data store objects e.g. percentage of object activity, level of object relative performance, e.g. relative to object's size or to best possible performance.

Successful use of a data store by users requires a complete understanding of its architecture. Many alternative representations of the same data store can be developed and used. These representations differ in semantics, symbols, and means of representing relationships. If a company's requirements are simple, the standard tools for data management satisfy all of the company's needs. However, if the company's needs become more complicated, it will need to look for more sophisticated data store management packages having more capabilities. Certain business processes are often managed using specialist data store products or applications which are specifically designed for managing and manipulating information within a specific business. Similarly, many business types such as manufacturing, publishing, insurance, etc. will have data store solutions specifically targeted at their precise needs and requirements. Data store architecture is continuously updated, reconstructed and renewed. In the course of time data store architecture becomes extremely complicated, and a lot of human effort is needed in order to even determine an approximation of the data store architecture. In an effort to provide a solution to this problem research has evolved in the direction of creating "autonomic databases". The goal of this research is to develop self-managing databases or, more generally, self-managing data stores. In other words, the goal is to develop data stores which can be self-configuring, self-optimizing, self-protecting and self-healing. One example of this type of research is the DB2 Autonomic Computing project, also known as SMART (Self-Managing And Resource Tuning) [http://www.almaden.ibm.com/cs/projects/autonomic/].

In most situations the typical user is someone who is not involved in the data store architecture development and/or maintenance and/or data mining and works only with a part of a data store. To use the data store efficiently, the user of the data store needs to understand accurately the architecture of the data store or at least the part of the data store that he needs to use at a particular time. To automatically define the architecture of a data store, existing systems (called "analyzers") are based on data store exploration and analysis of a dataset of users' queries. An efficient model of the data store architecture is not generated if the "analyzer" did not examine these two sources of knowledge. The problem with this approach is that the user needs to work with the data store i.e. to insert, to remove or to request data, before being able to receive an estimate of the architecture of the data store from the "analyzer".

It is therefore a purpose of the present invention to provide a method and a system for automatic recognition of data store architecture and tracking dynamic changes and evolution in it.

It is another purpose of the present invention to provide a method and a system which can automatically generate a data store architecture approximation.

It is yet another purpose of the present invention to provide a method and a system which can generate a data store architecture approximation working only with the data store and its data and without knowledge of previously asked queries.

It is still another purpose of the present invention to provide a method and a system which can track changes and evolution in data store architecture.

Further purposes and advantages of this invention will appear as the description proceeds.

SUMMARY OF THE INVENTION

The invention is a complementary system, which is added onto an existing data store system using the existing interfaces or is integrated with a data store system, and is configured to compose an approximation of the data store architecture. The complementary system comprises a "Data Store Analyzer" module, which comprises:
 (a) an Architecture Analysis Composer and Analyzer component, which is adapted to execute an analysis of the architecture of the data store;

(b) a Data Store Statistics Composer component, which is adapted to collect and compile statistics from the data store; and (c) a Data Store Architecture Composer component, which is adapted to compose an approximation of the architecture of the data store.

Embodiments of the complementary system of the invention additionally comprise a "Queries Analyzer" module, which comprises:

(a) a Query Analyzer component, which executes a syntactic analysis of a user query if a query is available;

(b) a Queries Statistics Composer component, which compiles statistics on query content and query environment properties;

(c) a Queries Architecture Composer component, which composes an updated approximation of the data store architecture;

(d) a Query Repository component, whose content is sent to the Queries Analyzer component, which uses it to execute an immediate and effective analysis of the impact of data store architecture changes and evolution as said data store changes are recognized by said system; and (e) a Resources Limits Detector component, which checks designated resources of the data store system, analyses the data store system resources limits, and sends a "Resources Analysis" report to the user.

The components of the Queries Analyzer module are configured to enable it to collect, to analyze and to generate statistics related to the users queries and to integrate the statistics with the approximation received from the "Data Store Analyzer" to compose a more precise approximation of the architecture of the data store.

In embodiments of the invention the data store approximation is a collection of statistics constructed from data extracted from the data store and stored as separate entities. The data store approximation may be used as an input to any data arrangement application. The data store approximation may be used by the data store administrator to change existing data store architecture.

In embodiments of the invention the Resources Limits Detector component comprises a specific software component that checks the resources of the data store system by tracking a few indicators of the performance of the data store system, in order to know if the available resources of the data store system can be used by the complementary system to carry out another cycle of data store architecture approximation improvement or if the data store system is too busy or does not have enough available memory, disc space, or CPU to enable the another cycle to be carried out.

In embodiments of the invention the complementary system does not contain a Resources Limit Detector component.

Embodiments of the complementary system of the invention are configured to dynamically recognize when data or tables are inserted, modified, or removed from the data store by automatically carrying out continuous data store architecture analysis and comparing the successive approximations of the architecture of the data store.

Embodiments of the complementary system of the invention are configured to work with a subset of data store which is obtained by sampling or by any other method of volume reduction.

Embodiments of the complementary system of the invention are configured to work with a mirrored data store which is obtained by duplicating the original data store.

Embodiments of the complementary system of the invention are configured to work with a Data Warehouse to improve performance by modifying the aggregation layer.

All the above and other characteristics and advantages of the invention will be further understood through the following illustrative and non-limitative description of preferred embodiments thereof, with reference to the appended drawings; wherein like components are designated by the same reference numerals.

DETAILED DESCRIPTION OF PREFERRED EMBODIMENTS

Figure 1:
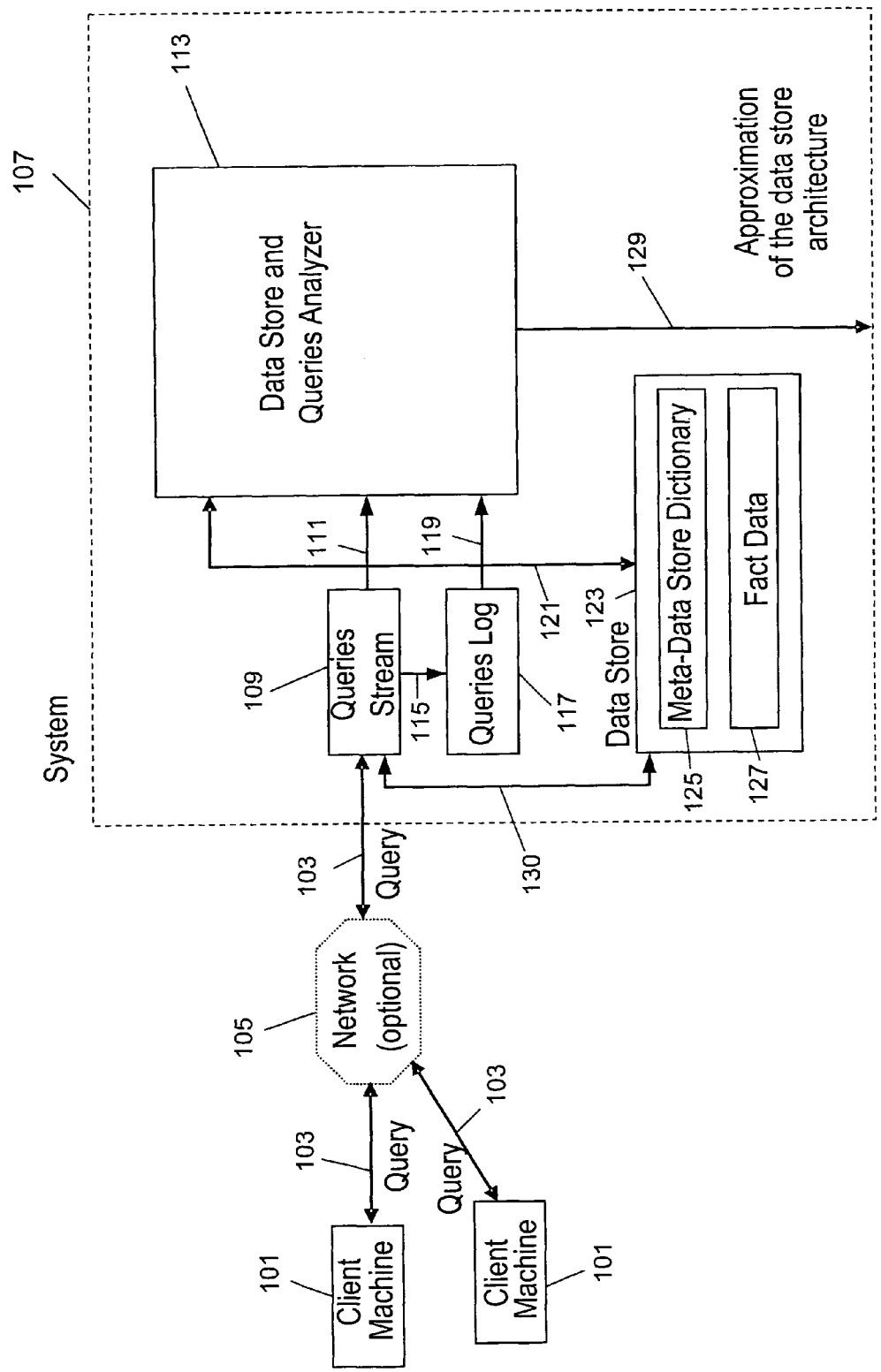
FIG. 1 schematically illustrates a prior art system workflow including a Data Store Architecture Analyzer module.

The current invention is described herein as a complementary system, which can be added-on to an existing data store system by using the existing interfaces in order to improve the data store performance. Skilled persons will realize that the system of the invention can also be totally integrated into data store systems having existing or new designs. The term "complementary system" as used herein refers to both add-on and integrated embodiments of the invention. The complementary system of the invention comprises a "Data Store Analyzer" module to analyze the data store based on the data store structure, to collect statistics from the data store, and to compose an approximation of the data store architecture. The approximation of the data store architecture is used to produce useful comments/recommendations to the data store user regarding the usage and/or effectiveness of the data store tables and/or as input to an automated system for supervision and management of digital data store systems in order to obtain the most efficient data arrangement and queries execution. The data store system to which the complementary system of the invention is added onto can be extended to apply to mirrored systems obtained by duplicating an original data store. Therefore, Herein the term "data store system" can be a single system or a mirrored system (two identical data duplicates); although, herein we will refer to a "data store system" as a single system. Herein the phrase "automated systems for management of digital data store systems" refers to a system that can make modifications and additions to the current structure and data in order to improve specific measures like performance, size, etc. These systems can add indexes to the tables, generate new tables, and can create or modify aggregation structures in an aggregation layer.

The present invention allows automatic recognition of data store architecture and automatic online and/or offline detection of data store architecture dynamic changes and evolution. The present invention is able to extract a data store architecture even when queries are not available, based only on a data store analysis.

The method of the invention is based on two steps:
In the first step, an analysis of the data store based on its structure and its data statistics is carried out by the "Data Store Analyzer module" (211 in FIG. 2a).
The second step takes place in the "Queries Analyzer module" (213 in FIG. 2b) and is based on collecting and analyzing the end-user queries and related statistics. These statistics are related to queries content, i.e. tables used, filters used, strength of filters, complexity of query, priority of query user, execution time of query in data store system, frequency of same query template usage. These statistics and others are used in order to detect active data store tables and to define effective data arrangements in order to get best performance for the end-users' queries stream.

The "Data Store Analyzer module" can work independently of the "Queries Analyzer module". The "Data Store Architecture Designer" is able to start working immediately to estimate the Data Store architecture, independently of queries availability and of any output from the "Queries Analyzer" module. This allows generation of an initial approximation of the data store architecture within an optimal timeframe and before getting users' queries. The combination of these two modules defines the "Data Store Architecture Designer" (209, FIG. 3-6). The software implementation of the invention can be interfaced with any existing or new data store system.

FIG. 1 illustrates a prior art data store system (107) which includes a "Data Store and Queries Analyzer" (113). To begin the data store (123) architecture analysis, this system needs to receive end-users' (101) queries (103 which are decomposed in (111,119) and to respond to some constraint defined by the data store administrator e.g. a minimum number of queries. An approximation of the data store architecture is generated and saved in the system. This approximation may be sent to the user (129) at any time that the user requests it. This approximation is based on knowledge (121) from the Data Store and on knowledge (111, 119) about the queries. This system (113) works necessarily with both data store analysis and end-users' queries analysis. This, as will be seen herein, is different from the system of the current invention which can deal with the two types of information separately and can produce results without the use of end-users' queries analysis. The bi-directional link (130) between data store (123) and queries stream (109) represents accessing the data store and receiving the answers to the queries. It is important to note that FIG. 1 presents the general schema of data flow. In particular, it shows the important special case when the data flow is executed on the same machine. The present invention can be adapted *mutatis mutandis* to other configurations of systems and will provide the same advantages as described herein.

Figure 2A:
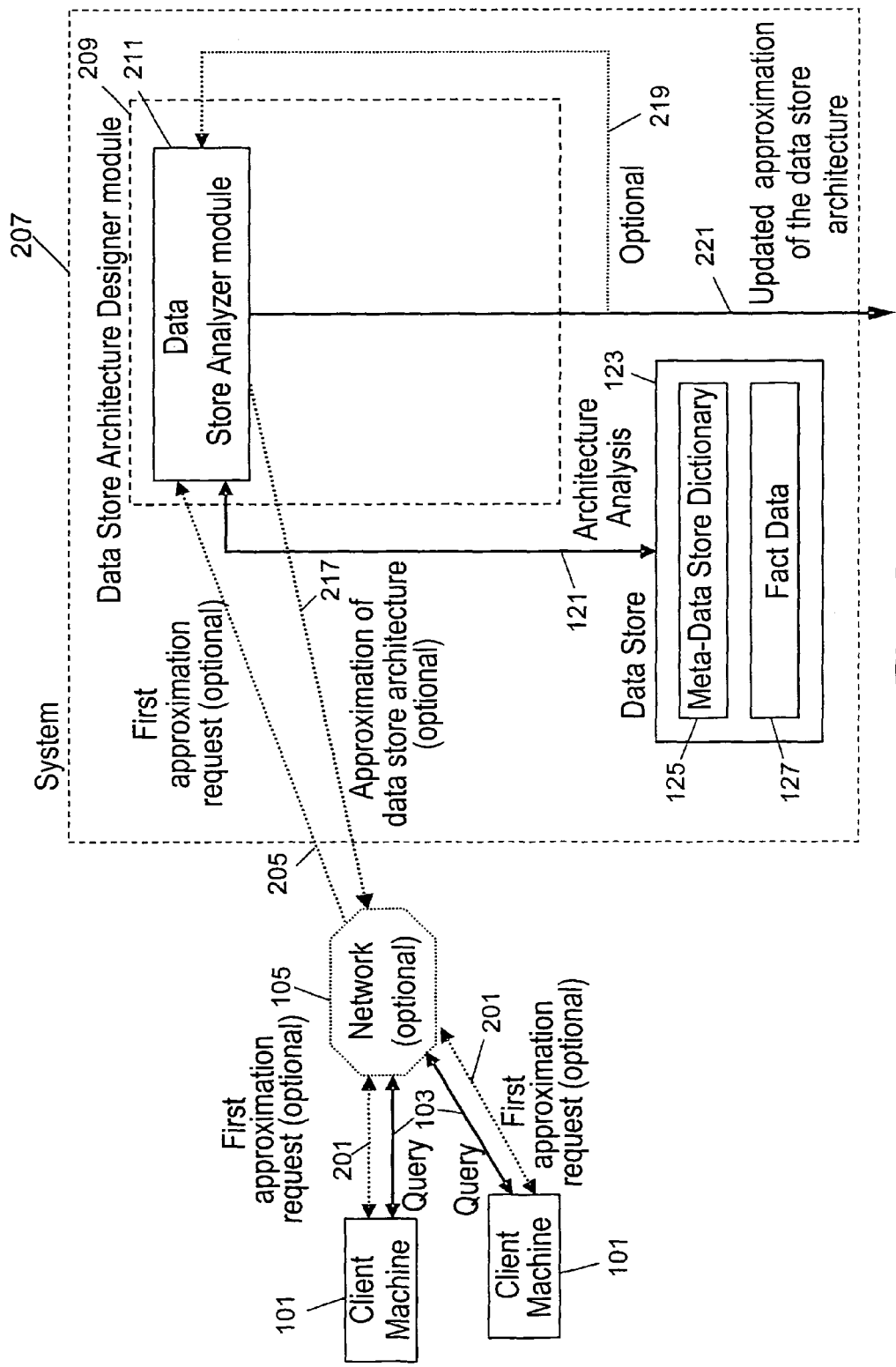
FIG. 2a schematically illustrates a system workflow with Data Store Architecture Designer from the optional data store approximation request answer to the updated approximation data step without users' queries analysis.
Figure 2B:
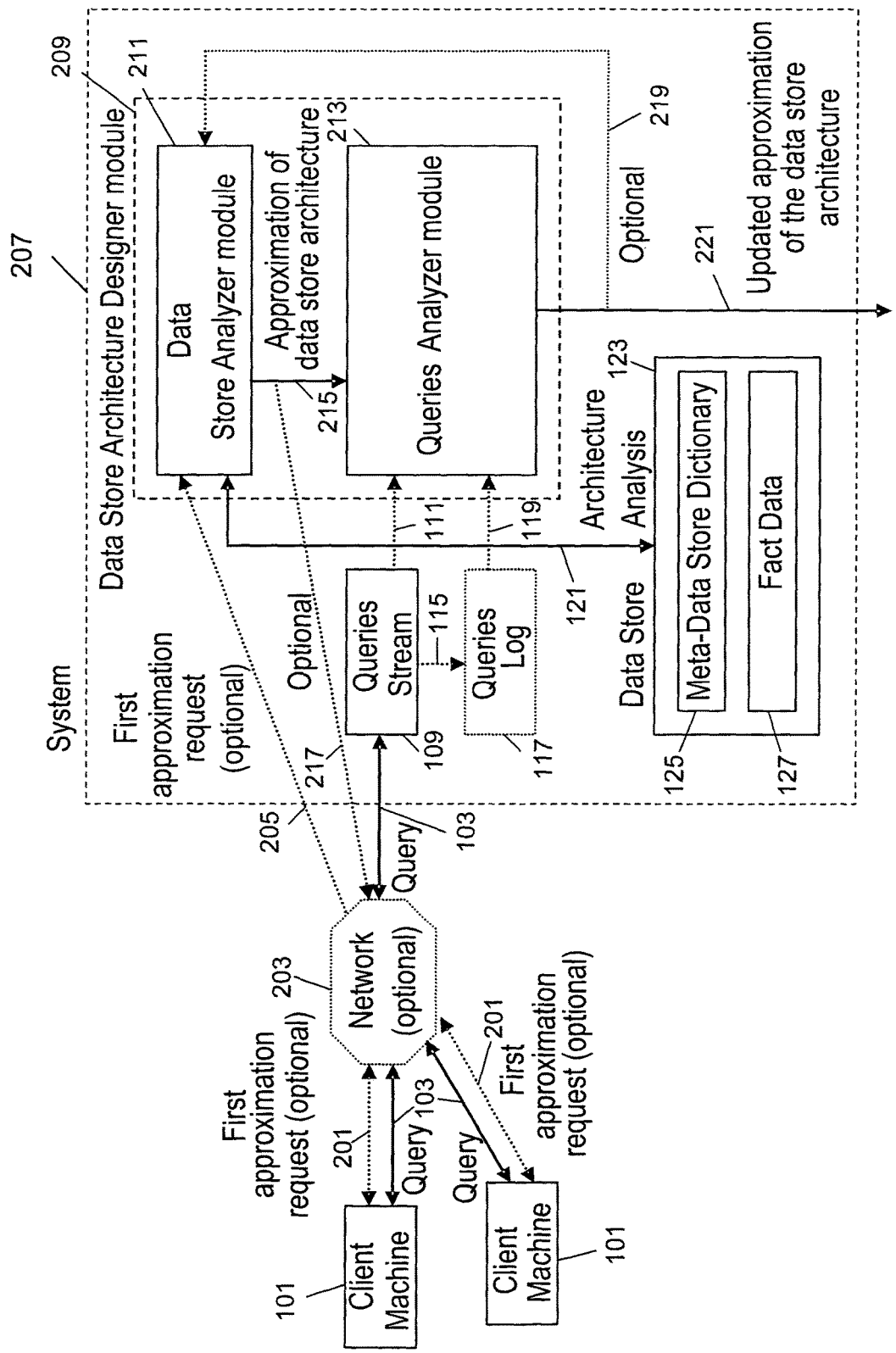
FIG. 2b schematically illustrates a system workflow with Data Store Architecture Designer from the optional data store approximation request answer to the updated approximation data step with users' queries analysis.

FIG. 2a and FIG. 2b illustrate the system structure showing the dataflow between the existing data store (123) and the "Data Store Architecture Designer" module (209) of the present invention.

FIG. 2a shows the basic embodiment of the invention. In this embodiment, the "Data Store Architecture Designer" module (209) comprises only the "Data Store Analyzer" module (211). The "Data Store Analyzer" module (211) starts, after its installation and runs immediately to perform only a data store structure analysis step and to generate a first approximation of the data store architecture. The first approximation of data store architecture is saved and returned to the user(s) (217) when the user asks for it or when some useful and new important information regarding data store objects is discovered by the system of the current invention. The approximation optionally goes back (219) to the "Data Store Analyzer" (211) for second cycle improvement (221) if the user asks for this and/or if the system resources limits allow it.

The following is a short example of the "Data Store Analyzer" processing. In this example a relational database and SQL syntax queries are used although any other language can be used instead. Firstly, all tables names are found using a simple query "Select*from tab;". Then the columns of each table are found by using "Select*from <table name>;". For each column that appears in queries the user gets its size is determined by using "Select count (<column name>) from <table name>;" and a size of all relevant (used in queries) columns together for each table. Different columns may express the same meaning. The duplication of the same information may be necessary for performance or other reasons. It is critical to identify the fact that different columns have essentially the same meaning. One way to do this is by comparing the columns names. In the majority of the cases, this is a good indication of equivalence. In some cases, however, this is not a sufficient property. A more reliable property is the following one: If the two columns are treated as equivalent in a query, e.g. they appear in the join statement with "=" between them, then most probably, they are indeed equivalent. It is noted that both situations can exist in a data store, i.e. there can be two columns with different names in different tables which are actually identical, and the opposite case in which two columns have the same names but actually hold different data.

The hierarchy of each data source file/table is recognized/estimated by count distinct values of each set of relevant columns. Conceptually a higher level of the hierarchy will have a smaller count distinct. This counting can be realized for all columns in the table using a single query that scans a data of a table only once. This is the fastest way to get sizes of columns. For example, given a table with two columns, COL1 and COL2, then in order to calculate the sizes of the columns the following query is used: "Select count (distinct (COL1)), count (distinct (COL2)) from <table name>;" should be used. Assume the table has the following content:

| COL1 | COL2 |
|------|------|
| 1 | Guy |
| 2 | Guy |
| 3 | Marina |

Then the size of the columns is determined by using a "COUNT DISTICT" query which returns the following result:

| COUNT (DISTINCT (COL1)) | COUNT (DISTINCT (COL2)) |
|---|---|
| 3 | 2 |

Note that although in the examples like "count distinct" it is required to go over the full table to get column size, volume reduction procedures known in the art can be applied such that it will not be necessary to go over the full table but an estimate based on a statistical sample is used. Examples of volume reduction procedures that can be used are: "The space complexity of approximating the frequency moments", by Noga Alon, Yossi Matias, Mario Szegedy and "Probabilistic Counting Algorithms for Data Base Applications", by Philippe Flajolet, G. Nigel Martin.

FIG. 2b schematically shows a second embodiment of the "Data Store Architecture Designer" module (209) of the invention. In this embodiment, "Data Store Architecture Designer" module (209) comprises the "Data Store Analyzer" module (211) and the "Queries Analyzer" module (213). This embodiment is used when users' queries are available. The "Queries Analyzer" module (213) gets these users' queries (111, 119) and analyzes them. Based on the approximation of data store architecture (215) from the, "Data Store Architecture Designer" module (209) and on queries analysis the "Queries Analyzer" module (213) composes and saves an updated approximation of data store architecture (221). The approximation can go back (219) to the "Data Store Analyzer" module (211) for second cycle improvement if the user asks for this and/or if the system resources limits allow it.

The following is a short example of the "Queries Analyzer" processing. In this example a relational database and SQL syntax queries are used. The example demonstrates how to drive the data model out from the given queries set. The following criteria are used:

Query Analyzer processes only SELECT-related statements, i.e. the query statements that are generally not intended to change the data store. Query Analyzer addresses information retrieval process whether data evolution is analyzed by Data Store Analyzer module. It is important to note that SELECT statement has a broader definition here. In particular, any nested query that contains SELECT sub-query is equally important and should be analyzed as well, and queries that will generate/populate tables based on other tables (e.g. summary tables—"create table as select . . . ") should also be analyzed.

The following examples are given for illustrative purposes only and should not be taken to limit the applicability of the invention to the star schema. The invention is equally effective when it is applied to other scenarios as well. A star schema is a useful architecture that has significant advantages over other data representations both in terms of performance and usability. A typical star schema comprises fact tables, auxiliary lookup tables and optional summary tables. A fact table contains basic data to be summarized and has flat structure. Columns of a fact table are can be fact columns and description columns. A fact column represents a measurement of any kind to be analyzed. A description column represents an attribute of the measurement, e.g. a time when the measurement was taken. A lookup table is a set of hierarchically organized data that allows categorical aggregations. The hierarchical structure of a lookup table consists from levels where the lowest level coincides with a fact data column.

EXAMPLE

A fact table represents a sequence of measurements of a patient's temperature taken on a daily basis. The data is represented by two columns "Time" and "Temperature":
Jan. 1 2008; 100
Jan. 2 2008; 97
.
.
.
Aug. 28 2008; 102.3

Here "Temperature" is a measurements column and "Time" is a description column. A lookup table represents the hierarchy of time and may contain, e.g., three levels: days, months and years. The days level is the lowest one and it coincides with the "Time" column of the fact table.

Query Analyzer proposes a good approximation of the aforementioned star schema. The suggested design is a result of a novel method of syntactical analysis of user's queries. The following is a recap of the basic methodology. For a SELECT query, the following taxonomy is used:

A criterion for a summary fact: A column that appears in the SELECT with the following property:
1. A grouping function is present and applied to the column. (A grouping function is a function that summarizes multiple values and returns a single value. Examples of SQL grouping functions include but not limited to sum, min max and average.)

A criterion for a lookup column: A column that appears in the SELECT or GROUP BY clauses.

A criterion for a lowest lookup column: A potential lowest level of a lookup table is the one with the following properties: (1) the column appears a WHERE clause and (2) the column is compared (using=sign) with another column in a different table.

A set of SELECT queries is analyzed by the following method. Originally, the output is empty. The queries are analyzed one-by-one is an arbitrary but fixed order. For each query two basic steps are executed. First, the aforementioned criteria are applied to each query. Second, the extracted taxonomy is unified with the current output. As a result, the output may be enlarged. After completing these steps the procedure is repeated for the next query. The process is terminated when all queries have been analyzed.

It is noted that a query may have complex structure and involve nested statements (as in the examples below). In this case each sub-query is processed recursively in the bottom-up way.

The following examples use Oracle database SQL syntax, but the method is applicable using any database SQL syntax.

Query #1

```
SELECT
    channel_id,
    sum(AMOUNT_SOLD) AMOUNT_SOLD,
    sum(QUANTITY_SOLD) QUANTITY_SOLD,
    sum((case
    when (PR.prod_list_price > SA.amount_sold /
    decode(nvl(SA.quantity_sold,0),0,1,SA.quantity_sold))
    then (PR.prod_list_price * SA.quantity_sold) −
    SA.amount_sold
    else 0 end)) DISCOUNT_AMOUNT
FROM
    sh.SALESANAT SA , sh.PRODUCTS PR
WHERE
    PR.PROD_ID = SA.PROD_ID
```

| Query #1 |
|---|
| GROUP BY<br>    channel_id<br>• Summary fields<br>  - Table SA<br>    • AMOUNT_SOLD<br>    • QUANTITY_SOLD<br>    • Function for DISCOUNT_AMOUNT<br>• Dimension fields<br>  - ??<br>    • Channel_id<br>  - PR<br>    • PROD_ID - lowest level |

| Query #2 |
|---|
| SELECT<br>    channel_class,<br>    sum(AMOUNT_SOLD) AMOUNT_SOLD,<br>    sum(QUANTITY_SOLD) QUANTITY_SOLD,<br>    sum((case<br>      when (PR.prod_list_price > SA.amount_sold /<br>      decode(nvl(SA.quantity_sold,0),0,1,SA.quantity_sold))<br>      then (PR.prod_list_price * SA.quantity_sold) − SA.amount_sold<br>      else 0 end)) DISCOUNT_AMOUNT<br>FROM<br>    sh.SALESANAT SA , sh.PRODUCTS PR , channels CH<br>WHERE<br>    PR.PROD_ID = SA.PROD_ID and<br>    CH.channel_ID = SA.channel_ID<br>GROUP BY<br>    channel_class<br>• Summary fields<br>  - Table SA<br>    • AMOUNT_SOLD<br>    • QUANTITY_SOLD<br>    • Function for DISCOUNT_AMOUNT<br>• Dimension fields<br>  - CH<br>    • Channel_id - lowest level<br>    • Channel_class<br>  - PR<br>    • PROD_ID - lowest level |

| Query #3 |
|---|
| SELECT<br>    calendar_month_desc,<br>    channel_class,<br>    sum(AMOUNT_SOLD) AMOUNT_SOLD,<br>    sum(QUANTITY_SOLD) QUANTITY_SOLD,<br>    sum((case<br>      when (PR.prod_list_price > SA.amount_sold /<br>      decode(nvl(SA.quantity_sold,0),0,1,SA.quantity_sold))<br>      then (PR.prod_list_price * SA.quantity_sold) − SA.amount_sold<br>      else 0 end)) DISCOUNT_AMOUNT<br>FROM<br>    sh.SALESANAT SA , sh.PRODUCTS PR , channels CH ,<br>    TIMES tm<br>WHERE<br>    PR.PROD_ID = SA.PROD_ID and<br>    CH.channel_ID = SA.channel_ID and<br>    tm.time_id=sa.time_id<br>GROUP BY<br>    calendar_month_desc,<br>    channel_class<br>• Summary fields<br>  - Table SA<br>    • AMOUNT_SOLD<br>    • QUANTITY_SOLD<br>    • Function for DISCOUNT_AMOUNT |

| Query #3 |
|---|
| • Dimension fields<br>  - CH<br>    • Channel_id - lowest level<br>    • Channel_class<br>  - PR<br>    • PROD_ID - lowest level<br>  - TM<br>    • time_id - lowest level<br>    • calendar_month_desc |

Figure 3:
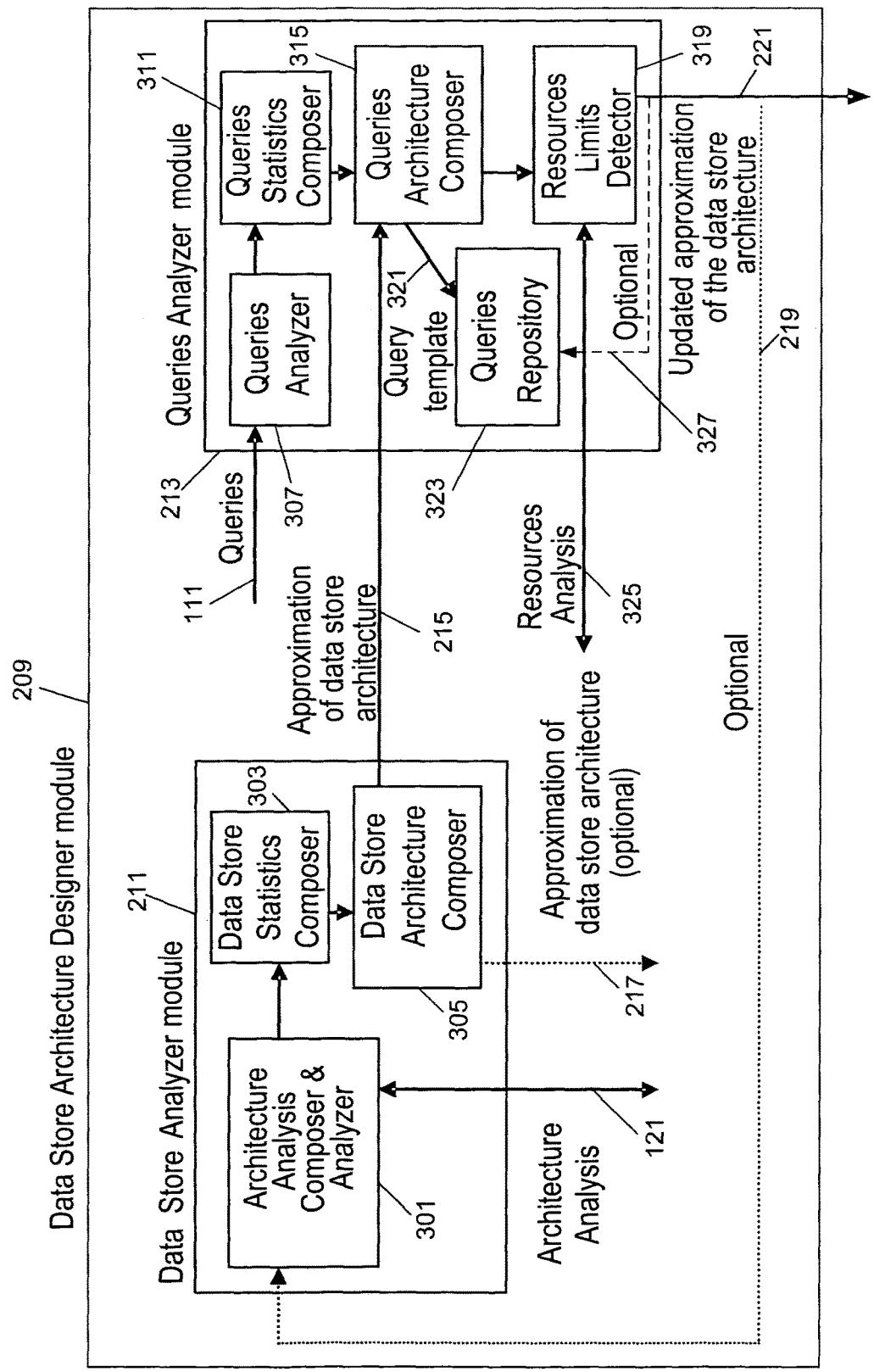
FIG. 3 schematically shows the Data Store Architecture Designer structure including the Data Store Analyzer module and the Queries Analyzer module when the system is not asked to detect data store architecture dynamic changes and evolution.

FIG. 3 illustrates the structure of the "Data Store Architecture Designer" module (209) when the system is not asked to detect data store architecture dynamic changes and evolution.

The "Data Store Analyzer" module (211) comprises the following components:

The "Architecture Analysis Composer & Analyzer" component (301), which executes data store architecture analysis;

The "Data Store Statistics Composer" component (303), which compiles statistics; and The "Data Store Architecture Composer" component (305), which composes a first approximation of the data store architecture.

The "Queries Analyzer" module (213) comprises the following components:

The "Queries Analyzer" component (307), which executes a syntactic analysis of the user query if queries (1 or more) are available;

The "Queries Statistics Composer" component (311), which compiles statistics on query content and query environment properties;

The "Queries Architecture Composer" component (315), which composes the updated approximation of the data store architecture (221);

The "Queries Repository" component (323), stores queries templates (321) sent to it by the Queries Architecture Composer (315) and optionally the updated approximation of the data store architecture (327) for later use. When the system is asked to detect data store architecture dynamic changes and evolution (see FIG. 5) the content of the Queries Repository component (323) is sent to Queries Analyzer component (307) where it is used to execute an immediate and effective analysis of the impact of the data store architecture changes and evolution as the data store changes are recognized by the system of the current invention; and The "Resources Limits Detector" component (319), which checks designated resources of the data store system, analyses the system resources limits, and sends the "Resources Analysis" (325) report to the user. Checking the resources is carried out using a specific software component to track a few indicators of the performances of the data store system, in order to know if the system of the current invention can use the available resources of the data store system in order to carry out another cycle of data store architecture approximation improvement or if the data store system is too busy or does not have enough available resources, e.g. memory, disc space, or CPU, to do this. The system of the invention can carry out this analysis either on the basis of knowledge of the data store system resources that has been provided to it by the user or it is capable of determining by itself what resources are available.

Figure 4:
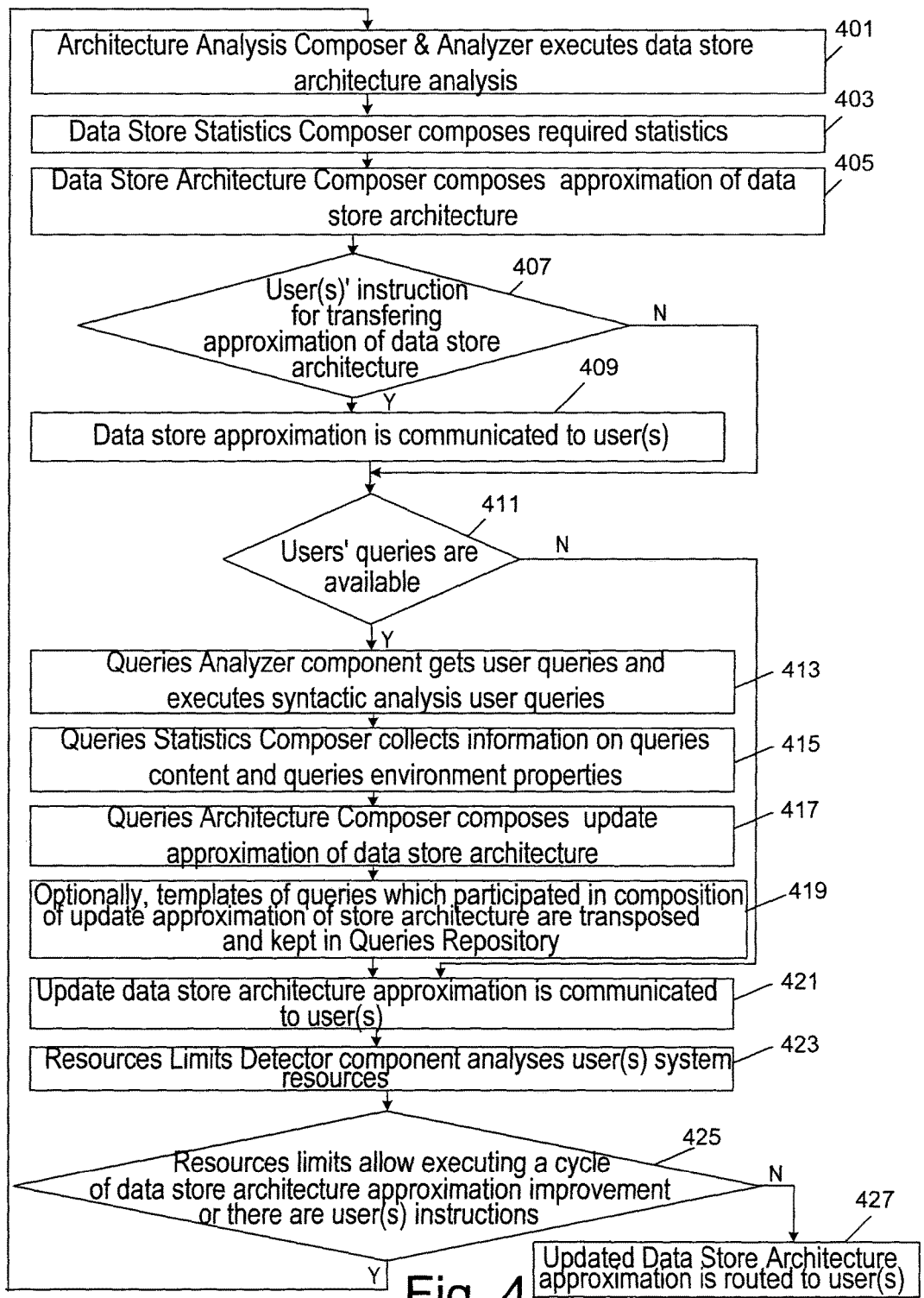
FIG. 4 schematically shows the Data Store Architecture Designer workflow with dynamic changes and evolution recognition.

FIG. 4 shows the flowchart of operations that take place in the "Data Store Architecture Designer" module (209).

In the first step (401), the "Architecture Analysis Composer & Analyzer" (301) in the "Data Store Analyzer module" (211) executes data store architecture analysis. The results of this analysis are sent to the "Data Store Statistics Composer" (303) which composes statistics that are required for the following steps of the process (403). In the third step (405), the "Data Store Architecture Composer" (305) composes an initial approximation of the data store architecture (405). If a user sends an instruction (205) (see FIG. 2b) to Data Store Analyzer Module (211) to transfer the approximation to him (407), then the approximation is communicated to him (409). If no instruction to transfer the initial approximation has been received then the process continues with step (411).

The next steps take place in the "Queries Analyzer" module (213). If users' queries are available (411), then the "Query Analyzer" component (307) gets the users' queries templates from the Queries Repository (323) and executes a syntactic analysis of them (413). Otherwise, Queries Analyzer (307) retrieve queries from available query logs or streams. The results of this analysis are used by the "Queries Statistics Composer" (311) which collects information on the content of the queries and their environment properties (415). In the next step (417), the "Queries Architecture Composer" (315) composes an updated approximation, of the data store architecture, based on the data which comes from step (415) and the first approximation (405). Optionally in step (419), templates of queries which participated in the composition of the updated approximation of the data store architecture in step (417) are transposed (321) and kept in the "Query Repository" (323). In a further step, the updated data store approximation is communicated to the user (421). In case users' queries are not available in step (411), then steps (413) to (419) are not performed and the process jumps directly to step (421). In step (423) the "Resources Limits Detector" component (319) analyses the system resources. If the "resources limits allow executing a new cycle of data store approximation to improve the current data store approximation or if there are user instructions (425) to do so, the process begins again at the first step (401). If the resources limits do not allow a new cycle of data store approximation, the updated data store architecture approximation is routed to the user. If the resources do not allow an updated approximation (step 425) to be made then, either manually or automatically at a predetermined time interval, the system executes step (423) to decide if conditions now allow an updated approximation to be made based on the current approximation saved in the system of the invention.

Figure 5:
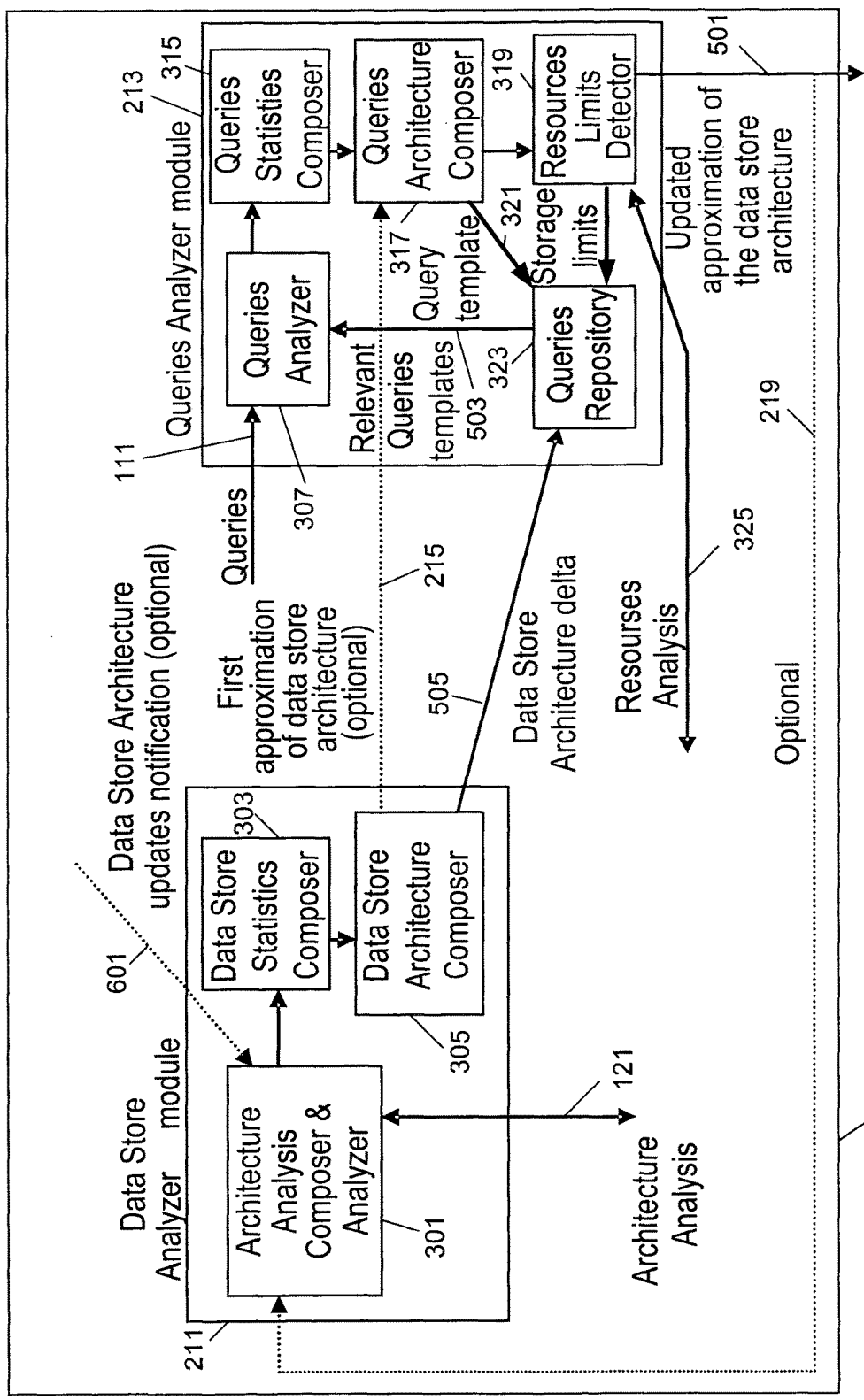
FIG. 5 schematically shows the Data Store Architecture Designer structure with dynamic changes and evolution recognition.

FIG. 5 schematically shows the architecture of the dynamic changes and evolution recognition process in the "Data Store Architecture Designer" module (209). Over time the data store architecture may change. The "Data Store Analyzer" module (211) of the present invention is configured to recognize these changes dynamically, e.g. to recognize when data or tables are inserted, modified, and removed. In addition, a user may optionally (601) (FIG. 5) notify the "Data Store Analyzer" module about data store changes. This notification may be general or may include details of specific data store changes. However even without user input, the "Data Store Analyzer" module (211) is able to detect data store changes by automatically carrying out continuous data store architecture analysis (401) and comparing the successive approximations. In addition, a new phase of analysis can be triggered by explicitly specified changes of data store. For instance, if the "Data Store Analyzer" module (211) witnesses a structure change, for example creation/deletion of a new/old table, triggered by a create/drop table command, or massive updates of existing tables, it may decide that the existing analyses is obsolete and new phase is necessary. If changes in the data store are recognized, the process of the data store architecture detection differs from the process shown previously in FIG. 4 in one important step. If the "Queries Repository" component (323) is used, then it receives (505) an input, known as the "Data Store Architecture Delta" from the "Data Architecture Composer" component (305) of the "Data Store Analyzer" module (211). "Delta" relates to changes in a part of the data store architecture. "Delta" is a report of information related to the changes that can be used automatically by the system or can be useful to the user. Based on the information in "Delta", the "Queries Repository" (323) selects relevant queries templates (503) e.g. queries templates which do not contain the changed components of data store and transfers them to the "Queries Analyzer" component (307). In this way the "Queries Analyzer" component (307) may start its work immediately, without waiting for a single query from users (321). This leads to significant improvement in the data store architecture detection process performance. At the end of the process cycle, the "Queries Architecture Composer" component (315) of the "Queries Analyzer" module (213) composes and saves an updated approximation of the data store architecture (501) which is transferred to the user (501, 421) at any time the user asks for it.

Starting with the existing approximation, the whole cycle or parts of the process of the data store architecture detection are repeated (219), according to user(s)' settings and/or according to system resources limits in order to obtain a better approximation.

Figure 6:
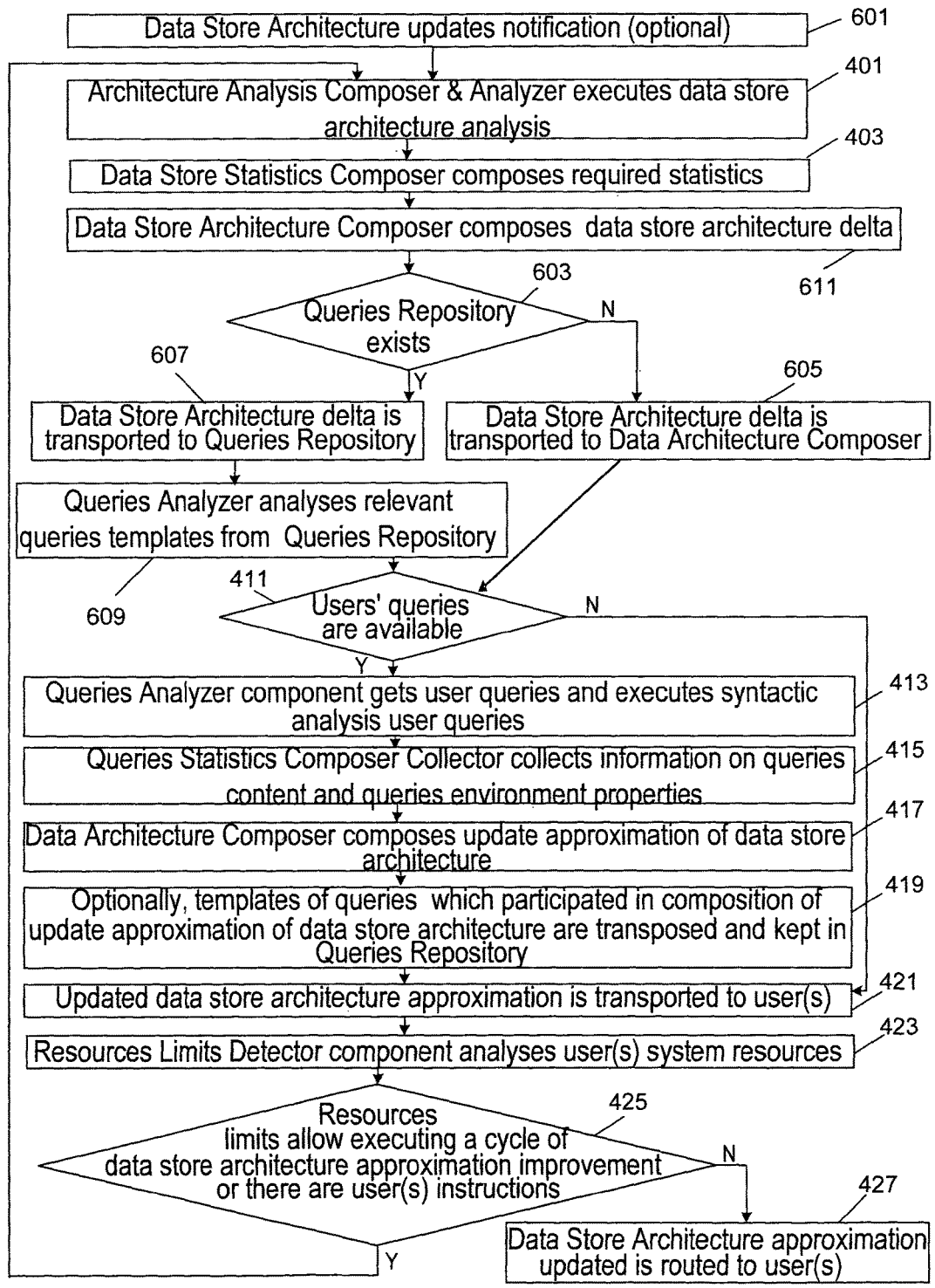
FIG. 6 schematically shows the Data Store Architecture workflow with dynamic changes and evolution recognition which is mainly different of FIG. 4 by the introduction of a prior Queries Repository analysis step.

FIG. 6 shows a flowchart of operations that take place in the "Data Store Architecture Designer" module (209) when dynamic changes and evolution recognition function of the invention is employed. Most of the stages in the flow chart of FIG. 6 are identical to corresponding stages in the flowchart of FIG. 4. The stages that are identical in both figures are identified by the same numeral.

In step one (401) "Architecture Analysis Composer & Analyzer" (301) of the "Data Store Analyzer module" (211) executes data store architecture analysis. This analysis can be started either by a "data store architecture notification" (601) from a user or by the resources limits analysis (step 425), which allows a new cycle of data store approximation. After it, the results are sent to the "Statistics Collector" (303) which composes required statistics (403). In a third step (405), the "Data Architecture Composer" (305) composes a "Data Store Architecture Delta".

If a "Queries Repository" (323) exists then the "Data Store Architecture Delta" is transported to "Queries Repository" (step 607) and then "Queries Analyzer" (307) analyzes relevant queries templates from the "Queries Repository" (step 609). If a "Queries Repository" does not exist, the "Data Store Architecture delta" is transported (605) to the "Data Architecture Composer (317). In both cases, if users' queries are available (411), then the "Query Analyzer" component (307) gets the users' queries from the data store and executes a syntactic analysis of them (413). The results of this analysis are used by the "Queries Statistics Composer" (311) which collects information on the content of the queries and their environment properties (415). In the next step (417), the "Queries Architecture Composer" (315) composes an updated approximation, of the data store architecture, based on the data which comes from step (415) and the first approximation (405). Optionally in step (419), templates of queries which participated in the composition of the updated approximation of the data store architecture step (417) are transposed and kept in the "Query Repository" (323). In a further step, the updated data store approximation is communicated to the user (421). In case users' queries are not available in step (411), then steps (413) to (419) are not performed and the process jumps directly to step (421). In step (423) the "Resources Limits Detector" component (319) analyses the system resources. If the "resources limits allow executing a new cycle of data store approximation to improve the current data store approximation or if there are user instructions (425) to do so, the process begins again at the first step (401). If the resources limits do not allow a new cycle of data store approximation, the updated data store architecture approximation is routed to the user.

It is important to note that the figures present the general schema of data flow. In particular, they show the important special case wherein the data flow is executed on the same system/machine. However the system can comprise more than one machine and the data will be run on different machines. In this case the dataflow will be between two or more machines. In any case, the advantages of the invention described hereinabove in terms of the special case apply to more general cases as well.

Although embodiments of the invention have been described by way of illustration, it will be understood that the invention may be carried out with many variations, modifications, and adaptations, without exceeding the scope of the claims.

What is claimed is:

1. A complementary system comprising:
a processing device comprising hardware;
a non-transitory computer-readable medium encoded with:
a data store analyzer module comprising:
an architecture analysis composer and analyzer component, which when executed by the processing device, causes the system to execute an analysis of an architecture of a data store prior to having received any user queries, wherein the analysis of the architecture of the data store identifies data store table names, identifies different columns in different tables of the data store that have duplicated data, and determines column sizes;
a data store statistics composer component, which when executed by the processing device, causes the system to collect and compile statistics from the data store; and
a data store architecture composer component, which when executed by the processing device, causes the system to compose an initial approximation of the architecture of the data store based on the analysis of the architecture of the data store prior to having received any user queries and independent of any output from a queries analyzer module;
the queries analyzer module, which comprises:
a queries analyzer component, which when executed by the processing device, causes the system to perform a syntactic analysis of a user query when a query is available;
a queries statistics composer component, which when executed by the processing device, causes the system to compile statistics on query content and query environment properties;
a queries architecture composer component, which when executed by the processing device, causes the system to compose an updated approximation of the data store architecture, including at least an update of the initial approximation of the architecture of the data store, the initial approximation of the architecture of the data store based on the analysis of the architecture of the data store prior to having received any user queries and independent of any output from the queries analyzer module;
a query repository comprising content, the query repository coupled to the queries analyzer component which is configured to use the query repository content to execute an immediate analysis of the impact of data store architecture changes as the data store changes are recognized by the system;
wherein the queries analyzer module components are configured to enable the queries analyzer module to collect, to analyze and to generate statistics related to the user queries and to integrate the statistics related to the user queries with the approximation received from the data store analyzer, that are based on the analysis of the architecture of the data store executed prior to having received any user queries, to compose a more precise approximation of the architecture of the data store;
wherein the complementary system is configured to dynamically detect when tables are inserted, modified, or removed from the data store by automatically carrying out continuous data store architecture analysis and comparing successive approximations of the architecture of the data store, and in response to detecting that a table has been inserted, modified, or removed from the data store, the query repository receives a report of changes to components of the data store from the data architecture composer component and selects one or more query templates that do not contain the changed components of the data store and transfers the selected one or more query templates to the query analyzer component;
wherein the complementary system comprises interfaces enabling the complementary system to interface with an existing data store system using existing interfaces or the complementary system is integrated with a data store system.

2. The complementary system according to claim 1, wherein the data store approximation includes a collection of statistics constructed from data extracted from the data store and stored as separate entities.

3. The complementary system according to claim 2, wherein the data store approximation is used as an input to any data arrangement application.

4. The complementary system according to claim 1, wherein the data store approximation is used by a data store administrator to change existing data store architecture.

5. The complementary system according to claim 1, further comprising a resources limits detector component, which when executed by the processing device, causes the system to check designated resources of the data store system, analyze the data store system resources limits, and generates and provides a resources analysis report, wherein the resources limits detector component comprises a specific software component that checks the resources of the data store system by tracking a few indicators of a performance of the data store system, in order to know if the available resources of the data store system are available for use by the complementary system to carry out another cycle of data store architecture approximation improvement or if the data store system is too busy or does not have enough available memory, disc space, or CPU available for use by the complementary system to carry out another cycle of data store architecture approximation improvement.

6. The complementary system according to claim 1, further comprising a resources limits detector component, which when executed by the processing device, causes the system to check designated resources of the data store system, analyze the data store system resources limits, and generates and provides a resources analysis report.

7. The complementary system according to claim 1, wherein the complementary system is configured to work with a subset of a data store which is obtained by sampling or by any other method of volume reduction.

8. The complementary system according to claim 1, wherein the complementary system is configured to work with a mirrored data stores which is obtained by duplicating the original data store.

9. The complementary system according to claim 1, wherein the complementary system is configured to work with a data warehouse to improve performance by modifying an aggregation layer.

10. The complementary system according to claim 1, wherein the analysis of the data store architecture comprises:
identification of table columns in a data store table that have a same meaning;
a determination of column sizes of the table; and
identification of a hierarchical structure of the table.

11. A method comprising:
executing, by a complementary computing system comprising hardware, an analysis of an architecture of a data store in prior to having received any user queries, wherein the analysis of the architecture of the data store identifies data store table names, identifies different columns in different tables of the data store that have duplicated data, and determines column sizes;
collecting and compiling statistics from the data store;
composing an initial approximation of the architecture of the data store using the analysis of the architecture of the data store prior to having received any user queries;
performing a syntactic analysis of a user query when a query is available;
compiling statistics on query content and query environment properties when queries are available;
composing one or more updated approximations of the data store architecture using the statistics on query content and query environment properties, including at least an update of the initial approximation of the architecture of the data store, the initial approximation of the architecture of the data store based on the analysis of the architecture of the data store prior to having received any user queries;
performing an analysis of the impact of data store architecture changes as the data store changes are recognized;
analyzing and generating statistics related to the users queries;
integrating the analyzed statistics with the approximation composed using the analysis of the architecture of the data store prior to having received any user queries to compose a more precise approximation of the architecture of the data store; and
dynamically detecting when tables are inserted, modified, or removed from the data store by automatically carrying out continuous data store architecture analysis and comparing successive approximations of the architecture of the data store;
in response to detecting that a table has been inserted, modified, or removed from the data store, receiving a report of changes to components of the data store and selecting one or more query templates that do not contain the changed components of the data store; and
transferring the selected one or more query templates to a query analyzer.

12. The method of claim 11, wherein the data store approximation includes a collection of statistics constructed from data extracted from the data store and stored as separate entities.

13. The method according to claim 12, wherein the data store approximation is used as an input to any data arrangement application.

14. The method according to claim 11, wherein the data store approximation is used by a data store administrator to change existing data store architecture.

15. The method of claim 11, the method further comprising:
identifying table columns in a data store table that have a same meaning;
determining column sizes of the table; and
identifying a hierarchical structure of the table.

16. A non-transitory computer-readable medium encoded with instructions thereon, wherein the instructions are readable by a computing device in order to cause the computing device to perform operations comprising:
executing an analysis of an architecture of a data store prior to having received any user queries, wherein the analysis of the architecture of the data store identifies data store table names, identifies different columns in different tables of the data store that have duplicated data, and determines column sizes;
collecting and compiling statistics from the data store using the analysis of the architecture of the data store user queries;
composing an initial approximation of the architecture of the data store using the executed analysis of the architecture of a data store performed prior to having received any user queries;
performing a syntactic analysis of a user query when a query is available;
compiling statistics on query content and query environment properties when queries are available;
composing one or more updated approximations of the data store architecture, including at least an update of the initial approximation of the architecture of the data store, the initial approximation of the architecture of the data store based on the analysis of the architecture of the data store prior to having received any user queries, using the statistics on query content and query environment properties;
performing an analysis of the impact of data store architecture changes as the data store changes are recognized;
analyzing and generating statistics related to the users queries;
integrating the analyzed statistics with the approximation composed using the analysis of the architecture of the data store executed prior to having received any user queries to compose a more precise approximation of the architecture of the data store; and
dynamically detecting when tables are inserted, modified, or removed from the data store by automatically carrying out continuous data store architecture analysis and comparing successive approximations of the architecture of the data store;

in response to detecting that a table has been inserted, modified, or removed from the data store, receiving a report of changes to components of the data store and selecting one or more query templates that do not contain the changed components of the data store; and transferring the selected one or more query templates to a query analyzer.

17. The non-transitory computer-readable medium of claim 16, wherein the data store approximation includes a collection of statistics constructed from data extracted from the data store and stored as separate entities.

18. The non-transitory computer-readable medium according to claim 17, wherein the data store approximation is used as an input to any data arrangement application.

19. The non-transitory computer-readable medium according to claim 16, wherein the data store approximation is used by a data store administrator to change existing data store architecture.

20. The non-transitory computer-readable medium according to claim 16, wherein the operations further comprise working with a data warehouse to improve performance by modifying an aggregation layer.

21. The non-transitory computer-readable medium according to claim 16, wherein the operations further comprise:

identifying table columns in a data store table that have a same meaning;

determining column sizes of the table; and identifying a hierarchical structure of the table.

\* \* \* \* \*